United States Patent
Mutalik et al.

(10) Patent No.: US 8,064,777 B2
(45) Date of Patent: Nov. 22, 2011

(54) FOUR QUADRANT LINEARIZER

(75) Inventors: Venkatesh Gururaj Mutalik, Middletown, CT (US); Marcel Franz Christian Schemmann, West Hartford, CT (US); Long Zou, Rocky Hill, CT (US)

(73) Assignee: ARRIS Group, Inc., Suwanee, GA (US)

( * ) Notice: Subject to any disclaimer, the term of this patent is extended or adjusted under 35 U.S.C. 154(b) by 848 days.

(21) Appl. No.: 12/001,929

(22) PCT Filed: Jun. 13, 2006

(86) PCT No.: PCT/US2006/023641
§ 371 (c)(1),
(2), (4) Date: Apr. 16, 2008

(87) PCT Pub. No.: WO2007/075191
PCT Pub. Date: Jul. 5, 2007

(65) Prior Publication Data
US 2009/0297153 A1    Dec. 3, 2009

Related U.S. Application Data

(63) Continuation of application No. PCT/US2006/023641, filed on Jun. 13, 2006, now abandoned.

(60) Provisional application No. 60/689,525, filed on Jun. 13, 2005.

(51) Int. Cl.
H04B 10/00    (2006.01)

(52) U.S. Cl. ......... 398/193; 398/194; 327/133; 327/317

(58) Field of Classification Search .......... 398/192–199; 327/133, 317
See application file for complete search history.

(56) References Cited

U.S. PATENT DOCUMENTS

| | | | | |
|---|---|---|---|---|
| 4,277,763 A | * | 7/1981 | Ward, Jr. | 331/96 |
| 4,992,754 A | * | 2/1991 | Blauvelt et al. | 330/149 |
| 5,132,639 A | * | 7/1992 | Blauvelt et al. | 330/149 |
| 5,227,736 A | * | 7/1993 | Tucker et al. | 330/149 |
| 5,282,072 A | * | 1/1994 | Nazarathy et al. | 398/193 |
| 5,373,384 A | * | 12/1994 | Hebert | 398/193 |
| 5,378,937 A | * | 1/1995 | Heidemann et al. | 327/306 |
| 5,396,189 A | * | 3/1995 | Hays | 330/149 |
| 5,424,680 A | * | 6/1995 | Nazarathy et al. | 330/149 |
| 5,430,569 A | * | 7/1995 | Blauvelt et al. | 398/199 |
| 5,453,868 A | * | 9/1995 | Blauvelt et al. | 398/199 |
| 5,600,472 A | * | 2/1997 | Uesaka | 398/158 |
| 5,798,854 A | * | 8/1998 | Blauvelt et al. | 398/194 |
| 5,939,920 A | * | 8/1999 | Hiraizumi | 327/306 |
| 6,055,278 A | * | 4/2000 | Ho et al. | 375/296 |
| 6,122,085 A | * | 9/2000 | Bitler | 398/193 |
| 6,133,790 A | * | 10/2000 | Zhou | 330/149 |
| 6,140,858 A | * | 10/2000 | Dumont | 327/317 |
| 6,144,706 A | * | 11/2000 | Sato et al. | 375/296 |
| 6,204,718 B1 | * | 3/2001 | Pidgeon, Jr. | 327/318 |
| 6,232,836 B1 | * | 5/2001 | Zhou | 330/149 |
| 6,288,814 B1 | * | 9/2001 | Blauvelt | 398/193 |
| 6,519,374 B1 | * | 2/2003 | Stook et al. | 385/2 |
| 6,549,316 B2 | * | 4/2003 | Blauvelt | 398/119 |
| 6,574,389 B1 | * | 6/2003 | Schemmann et al. | 385/24 |

(Continued)

*Primary Examiner* — Agustin Bello
(74) *Attorney, Agent, or Firm* — Troy A. Van Aacken; Robert J. Starr

(57) ABSTRACT

A system includes a laser generator, and a signal distortion generator circuit inline with the laser generator modulation signal and configured to generate distortion vectors in any of four distortion vector quadrants.

4 Claims, 7 Drawing Sheets

U.S. PATENT DOCUMENTS

| | | | |
|---|---|---|---|
| 6,593,811 B2 * | 7/2003 | Schemmann et al. | 330/110 |
| 6,724,253 B2 * | 4/2004 | Hau et al. | 330/149 |
| 6,985,020 B2 * | 1/2006 | Zhou | 327/317 |
| 7,208,992 B1 * | 4/2007 | Mukherjee et al. | 327/317 |
| 7,466,925 B2 * | 12/2008 | Iannelli | 398/182 |
| 7,634,198 B2 * | 12/2009 | Peral | 398/159 |
| 7,676,161 B2 * | 3/2010 | Roberts et al. | 398/194 |
| 7,750,733 B2 * | 7/2010 | Sorrells et al. | 330/124 R |
| 7,835,709 B2 * | 11/2010 | Sorrells et al. | 455/127.3 |
| 7,844,235 B2 * | 11/2010 | Sorrells et al. | 455/127.3 |
| 2004/0047432 A1 * | 3/2004 | Iwasaki | 375/297 |
| 2005/0271396 A1 * | 12/2005 | Iannelli | 398/193 |
| 2007/0248156 A1 * | 10/2007 | Sorrells et al. | 375/229 |
| 2009/0297153 A1 * | 12/2009 | Mutalik et al. | 398/81 |

* cited by examiner

FOUR QUADRANT LINEARIZER

PRIORITY CLAIM AND CROSS REFERENCE TO RELATED APPLICATIONS

This application claims priority under 35 U.S.C. 120 and/or 35 U.S.C. 365 as a continuation of the PCT application having the title FOUR QUADRANT LINEARIZER, having application number PCT/US2006/23641, filed on Tuesday, Jun. 13, 2006, now expired.

TECHNICAL FIELD

The present disclosure relates to linearization of lasers for use in optical signal transmission.

BACKGROUND ART

One technique for sending more signals down an existing fiber optic infrastructure involves the use of multi-wavelength systems. Such systems are subject to various distortions and other negative effects that degrade the optical signal passing through the system. One class of such negative effects involves chromatic dispersion, both positive and negative. Other negative effects in multi-wavelength systems result from fiber nonlinearities, including stimulated Raman scattering (SRS) cross-talk, stimulated Brillioun scattering (SBS), cross-phase modulation (XPM), and self-phase modulation (SPM).

SRS and chromatic dispersion are generally the dominant limiting effects in multi-wavelength systems. There is typically little or no interaction between SRS and chromatic dispersion. SRS is a phenomenon depending upon power output and wavelength, total power in the fiber, a number of wavelengths used in the fiber, spacing of the optical wavelengths, fiber distance, fiber dispersion, RF frequency, and state of polarization. The interplay between these various parameters may be complex.

Fiber optic transmission systems signals are affected by two types of distortions: device distortions and fiber distortions. These distortions are due to the non-linearity of the devices (such as lasers) and of the fiber used in the optical fiber transmission system. Both the fiber and the laser may introduce distortions as a function of frequency. The magnitude and phase of the laser generator distortions may depend on frequency, temperature, and current value. The magnitude and phase of the fiber distortions may depend on frequency and on the dispersion characteristics of the fiber.

Typical distortion compensators attempt to cancel these distortions by sending signals of opposite polarity so they will cancel out the non-linear effects of the system. However, conventional systems do not accommodate distortions in a four quadrants of the real and imaginary signal axis.

Conventional device distortion compensating circuits compensate for device distortions with an inline pre-distorter (FIG. 4) or auxiliary line pre-distorter (FIG. 5). Examples include those described in U.S. Pat. Nos. 5,115,440, 4,992,754, 5,132,639, 5,252,930, and 5,798,854, the entire contents of each are incorporated by reference. Prior art inline pre-distorterers may be compact circuits that are lossy and do not cover all quadrants without greater complexity or an increase in signal loss. The devices may have a high impedance (unless lossy impedance transformers are used) such that component parasitics are more difficult to handle in a 1 GHz design. The devices may exhibit good phase control due to compact design but poor phase control due to component parasitics. Prior art auxiliary path predistorterers are large expensive circuits that offer lower loss and an ability to adjust distortion phase and amplitude. However, these devices are overly complex to handle distortion phase errors at high (1 GHz) frequencies.

More advanced devices include chromatic dispersion compensator circuits which compensate for positive chromatic dispersion, such as when a standard (e.g., single mode fiber (SMF) 28) fiber has analog or quasi analog signals at 1550 nm (e.g., U.S. Pat. Nos. 6,687,432 and 6,574,389, the entire contents of each are incorporated by reference). These devices work by varying an input signal delay as a function of frequency to handle positive chromatic dispersion effects. Chromatic dispersion compensators which compensate for composite second order (CSO) and composite triple beat (CTB) or both are described in U.S. Pat. Nos. 6,574,389 and 6,687,432, the entire contents of each are incorporated by reference. These devices operate by varying an input signal delay to overcome chromatic dispersion. These devices cannot change distortion phase to handle negative chromatic dispersion distortion. These devices also cannot handle certain types of laser distortion.

In another conventional approach, a non-linear feedback loop is used to cancel out distortions in the input signal (see e.g., U.S. Pat. No. 6,593,811, the entire contents of which are incorporated herein by reference). This is a relatively non-lossy circuit which can cover multiple quadrants due to presence of both signal polarities. This device does support 1 GHz amplifier operations and provides an ability to swap predistortion phase to compensate varying laser distortion as temperature or output power is varied. This device also enables use of uncooled coaxial lasers due to ability to adjust distortion phase in multiple quadrants. However, feedback delay limits the useful bandwidth of linearization and limits the phase control of a linearizer output. This device also does not operate over 4 quadrants (simultaneously/sequentially).

In addition to distortions in the fiber optic communication system there is also crosstalk from other wavelengths in the case that more than one wavelength is carried in a single glass fiber. This crosstalk is caused by sources such as XPM and SRS [Ref. A: Journal of Lightwave Technology, Vol. 18, p. 512, 2000] and also polarization state modulation through XPM and WDM filter crosstalk. Ref A teaches a method to reduce the effects of XPM crosstalk in an externally modulated system by using 3 wavelengths in a dual output/dual receiver system. This is an undesirably complicated system that also requires dispersion compensation to achieve XPM reduction.

DISCLOSURE OF INVENTION

The following summary is intended to highlight and introduce some aspects of the disclosed embodiments, but not to limit the scope of the claims. Thereafter, a detailed description of illustrated embodiments is presented, which will permit one skilled in the relevant art to make and use various embodiments.

A signal distortion generator circuit may be configured to generate distortion vectors in any of four distortion vector quadrants. The circuit may have independent control points for a positive real component of the distortion vectors, the negative real component of the distortion vectors, the positive imaginary component of the distortion vectors, and the negative imaginary component of the distortion vectors. The circuit may have one or more diodes through which the current may be controlled to affect the positive real component of the distortion vectors, one or more diodes through which the current may be controlled to affect the negative real component of the distortion vectors, one or more varactors at which the voltage may be controlled to affect the positive imaginary component of the distortion vectors, and one or more varactors at which the voltage may be controlled to affect the negative imaginary component of the distortion vectors. The circuit may include non-linear feedback amplifiers for each of a positive and negative signal path.

A system may include and/or involve a laser generator, and a signal distortion generator circuit inline with the laser generator modulation signal and configured to generate distortion vectors in any of four distortion vector quadrants. The system may include and/or involve logic to cancel composite second order and composite triple beat distortion produced by the laser generator, and/or logic to cancel composite second order and composite triple beat distortion induced by fiber dispersion, and/or logic to cancel signal distortion resulting from stimulated Raman scattering cross-modulation, and/or logic to cancel signal distortion resulting from any combination of laser modulation non-linearity, fiber dispersion, and-or stimulated Raman scattering cross-modulation.

The system may include and/or involve logic to cancel non-linearities resulting from use of an un-cooled laser, and/or an un-cooled laser with a cooler, and/or an un-cooled cooler-less laser, and/or a laser operating in a 1260 to 1620 nm wavelength window, and/or a laser operating on the CWDM and-or DWDM ITU grid.

The system may include and/or involve logic to accept input on whether to enable dispersion distortion compensation, and/or logic to accept input on whether to cancel multi-wavelength cross-talk distortion, and/or logic to automatically adjust distortion cancellation according to at least one of a temperature, bias level, or signal power of the laser generator, and/or logic to adjust the distortion vectors according to at least one of a type, performance, or wavelength output of the laser generator.

The system may include and/or involve a signal distortion generator circuit parallel with the laser generator modulation signal and configured to generate distortion vectors in any of four distortion vector quadrants.

The system may include and/or involve a modulation signal source. The modulation signal source may include and/or involve an RF modulation signal source, and/or an analog modulation signal source, and/or a QAM modulation signal source.

Other system/method/apparatus aspects are described in the text (e.g., detailed description and claims) and drawings forming the present application.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

INDUSTRIAL APPLICABILITY AND MODES FOR CARRYING OUT THE INVENTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to influence the operation of a device. Software, hardware, and firmware are examples of logic. Hardware logic may be embodied in circuits. In general, logic may comprise combinations of software, hardware, and/or firmware.

One manner of reducing distortion effects in a hybrid RF/optical communication system is to generate an "anti-distortion" signal to cancel out the distortion effects. One manner of accomplishing this is to pre-distort the RF modulation signal to a laser generator, such that the generated distortion has a similar magnitude but opposite (180 degrees out of phase) phase as the distortion generated by the laser generator and subsequent transmission media.

The distortion introduced by optical components (e.g. laser generators, amplifiers, etc.) and fiber transmission media may be characterized by a vector comprising real and imaginary components. Each component may assume either a positive or a negative value. Component and fiber characteristics may vary significantly, and may vary over according to operating conditions such as laser bias, temperature, fiber length, and signal frequency. Consequently the individual and composite distortion vectors characterizing the system may be located in any of the four quadrants: positive real component/positive imaginary component, positive real component/negative imaginary component, negative real component/positive imaginary component, and negative real component/negative imaginary component.

Consequently, it is advantageous for the predistortion generation circuit to generate predistortion vectors in all four quadrants.

Figure 1:
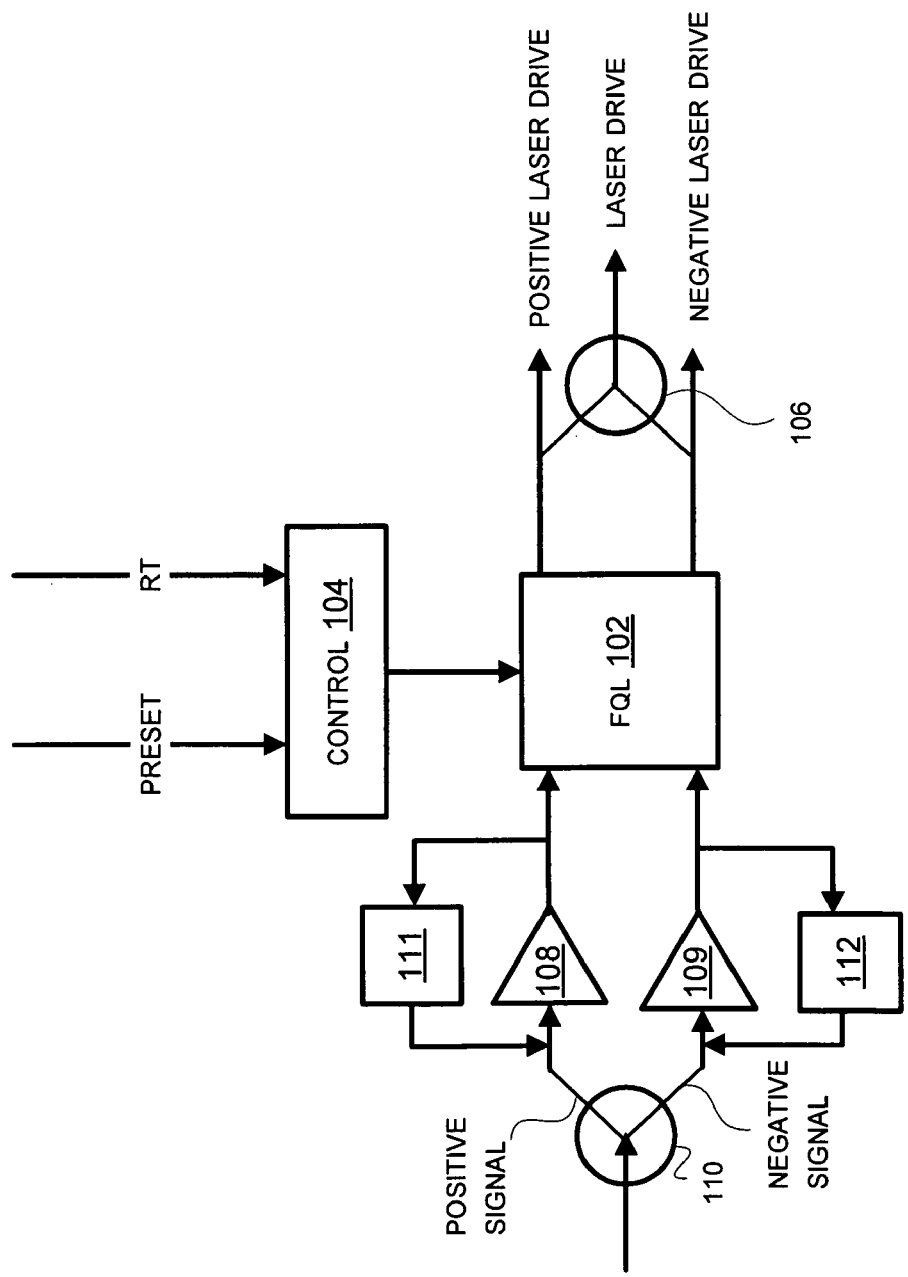
FIG. 1 is a block diagram of an embodiment of a circuit including a four-quadrant linearizer (FQL).

FIG. 1 is a block diagram of an embodiment of a circuit including a four-quadrant linearizer (FQL) 102. The FQL 102 may be used to generate a predistortion signal in any of the four quadrants. The FQL 102 may be embodied as a circuit interposed on a positive and negative laser drive channel. Positive and negative electrical signals may be input into the FQL 102. The FQL 102 may operate on these input signals on the basis of real time control signals provided by a controller 104. The real time control signals may be adjusted according to temperature, frequency, length of fiber, and other parameters which effect the distortion of an RF-modulated laser signal. The FQL 102 may also be set with preset parameters from the controller 104.

The positive and negative signal inputs to the FQL 102 may be created by applying an RF input signal to a balun 110. Outputs of the balun 110 are fed to corresponding positive signal and negative signal amplifiers (108 and 109, respectively). Outputs of the positive signal amplifier 108 and negative signal amplifier 109 may optionally be fed back through non-linear feedback circuits 111 and 112, respectively. The non-linear circuits may, in some embodiments, be as described in U.S. Pat. No. 6,593,811, which is hereby incorporated by reference in its entirety. Optional amplifiers may be installed before and/or after the FQL 102. The signal output of the FQL 102 may be used as positive and negative laser drive signals. The signal output of the FQL 102 may be combined in a balun 106 before being applied to a laser drive.

The FQL 102 may provide linearization of second and third order signal distortions and may operate at low loss over four phase quadrants. The FQL 102 may be effectively coupled to differential drive laser, such a coaxial laser. Low impedance in the FQL 102 may allow for larger component parasitics, making the device suitable for 1 GHz operation. The FQL 102 may comprise a compact design configured to allow for good phase control.

The FQL 102 may be deployed in both inline and auxiliary (parallel) line configurations, or combinations thereof.

The FQL 102 enables predistortion phase adjustments to compensate for laser distortions which vary as temperature and/or output power is varied. The FQL 102 may allow for adjustment of predistortion phase to accommodate negative and positive dispersion-generated distortion, thereby being suitable to various fiber types and signal wavelengths. The FQL 102 may generate a compensation distortion signal of either positive or negative sign to compensate for chromatic dispersion induced distortion.

The FQL 102 provides device and fiber (chromatic dispersion) compensation over four quadrants, by performing distortion cancellation for both positive and negative distortion regimes. The device may also perform distortion compensation in more than one main paths or auxiliary paths of an optoelectronic circuit.

The controller 104 may comprise logic to cancel composite second order and composite triple beat distortion produced by a laser generator, and/or logic to cancel composite second order and composite triple beat distortion induced by fiber dispersion, and/or logic to cancel signal distortion resulting from stimulated Raman scattering cross-modulation, and/or logic to cancel signal distortion resulting from any combination of laser modulation non-linearity, fiber dispersion, and-or stimulated Raman scattering cross-modulation.

The controller 104 may include and/or involve logic to cancel non-linearities resulting from use of an un-cooled laser, a laser diode, and/or an un-cooled laser with a cooler, and/or an un-cooled cooler-less laser, and/or a laser operating in a 1260 to 1620 nm wavelength window, and/or a laser operating on the CWDM and-or DWDM ITU grid.

The controller 104 may comprise logic to accept input on whether to enable dispersion distortion compensation, and/or logic to accept input on whether to cancel multi-wavelength cross-talk distortion, and/or logic to automatically adjust distortion cancellation according to at least one of a temperature, bias level, or signal power of the laser generator, and/or logic to adjust the distortion vectors according to at least one of a type, performance, or wavelength output of the laser generator.

The input signal to balun 110 may be, for example, an RF modulation signal source, and/or an analog modulation signal source, and/or a QAM modulation signal source.

Figure 2:
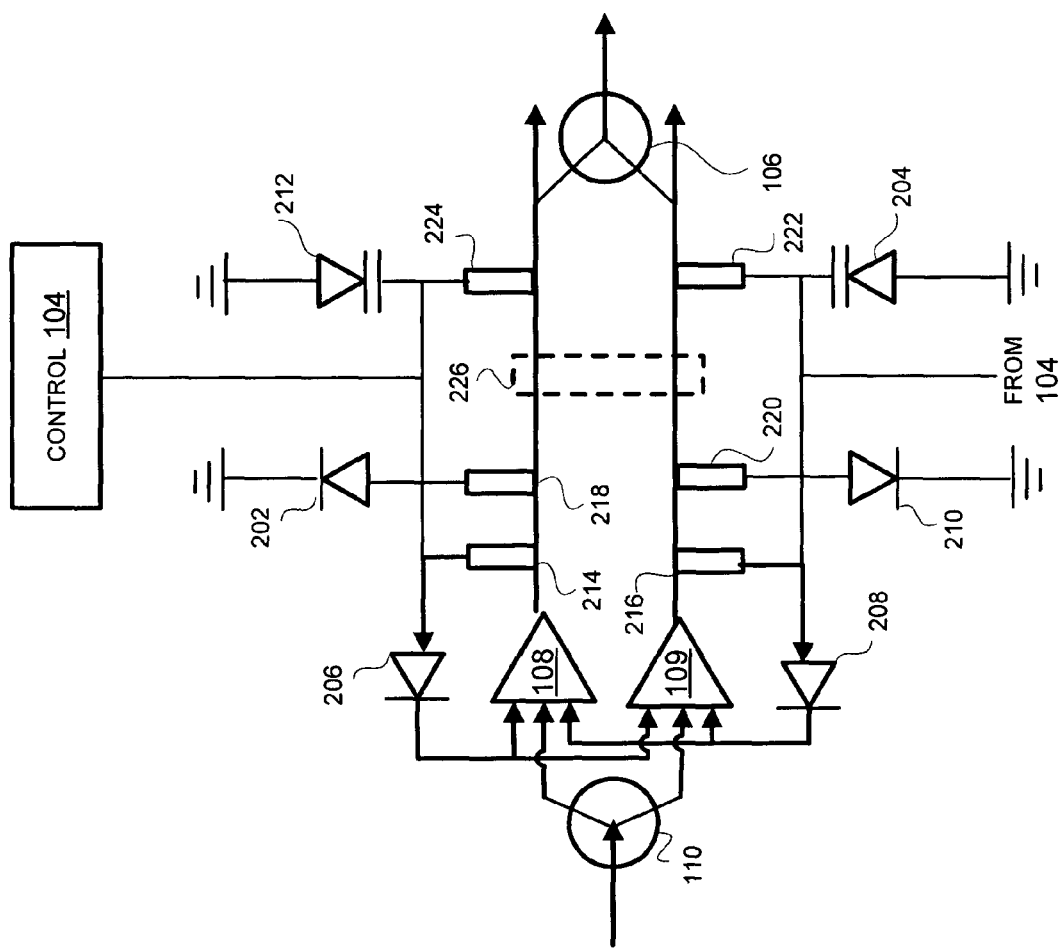
FIG. 2 is a more detailed block diagram of an embodiment of the circuit of FIG. 1 including a four-quadrant linearizer (FQL).

FIG. 2 is a more detailed block diagram of an embodiment of the circuit of FIG. 1 including a four-quadrant linearizer (FQL) 102. Non-linear feedback circuits 111 and 112 may include, in some embodiments, impedance elements 214 and 216, respectively, and diodes 206 and 208, respectively. The FQL 102 may further comprise impedance elements 218, 224, 220, and 222. In some implementations the impedance elements may be substantially resistive in nature. The positive real component of the generated pre-distortion vector may be controlled by affecting the current through diodes 202 and 206. The negative real component of the generated pre-distortion vector may be controlled by affecting the current through diodes 208 and 210. The positive imaginary component of the generated pre-distortion vector may be controlled by affecting the voltage at varactor 212. The negative imaginary component of the generated pre-distortion vector may be controlled by affecting the voltage at varactor 204.

An optional amplification phase 226 may be provided in the circuit to affect pre-distortion signal levels.

Those skilled in the art will appreciate that equivalent circuit function may be achieved using other electronic components/configurations and/or combinations thereof. One example would be the use of discrete diodes and capacitors in place of varactors in certain implementations. In some implementations it may also be possible to achieve the non-linear effects of diodes using other circuit elements.

Figure 3:
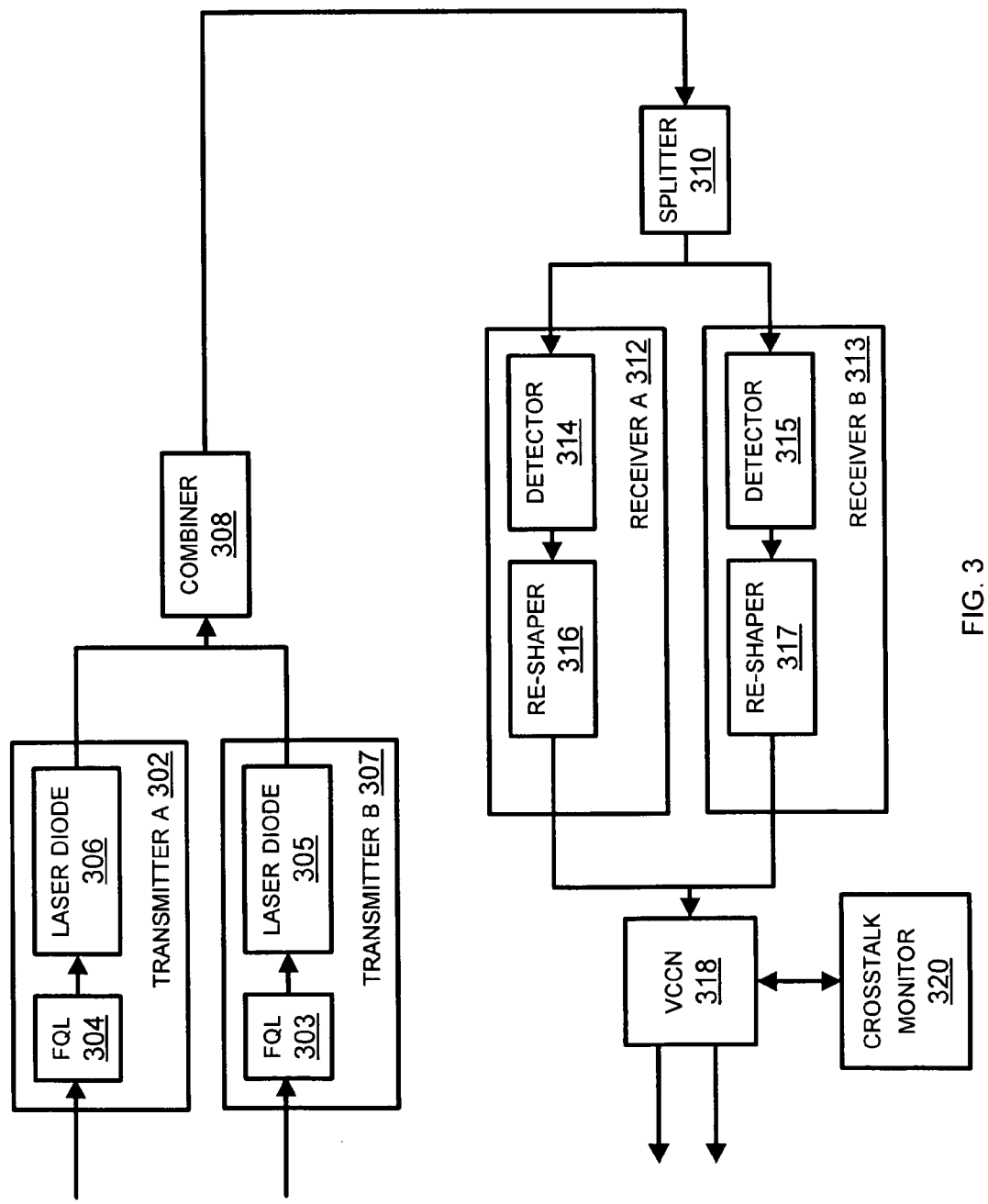
FIG. 3 is an embodiment of a multiple transmitter/receiver communication system employing FQLs.

FIG. 3 is an embodiment of a multiple transmitter/receiver communication system employing FQLs. A pair of transmitters 302 307 each comprises an FQL (304 and 303 respectively) where each FQL is used such that the signals are pre-shaped to reduce the effect of laser clipping, a detrimental effect that occurs when lasers 306 and 305 are modulated to the point that the light output reaches zero. Each transmitter 302 307 may modulate light of a different frequency. The pre-shaped signals are provided to a combiner 308 and communicated to a splitter 310, where they are separated again into signals of different wavelengths.

The pre-shaping adds distortions to the modulated signal that are fed to receivers 312 313, where the signals are detected by detectors 314 315 and applied to a re-shaping circuit 316 317, essentially a distortion generator that provides distortions opposite to those introduced by the pre-shaping such that the distortions are cancelled out. In the case of a multi-wavelength system there still is crosstalk between the channels and this crosstalk can be monitored in the receiver outputs by a crosstalk monitor 320, for instance by monitoring a pilot tone that is injected at (one of) the transmitters 302 307. The monitor signal voltage is then used to control a voltage-controlled combiner network (VCCN) 318 that combines the receiver outputs such that the crosstalk signal is cancelled. The receivers 312 313 may also monitor the output of the VCCN 318 to zero crosstalk by using a feedback from the output to the monitor block 320.

In some implementations the FQLs 304 303 in the transmitters 302 307 may be used to generate signal pre-shaping to avoid laser clipping in such a way that the distortions are out of the signal band. This allows reconstruction of the original signals at the receivers 312 313 by simple filtering of the out of band distortion signals, or, in the case where the presence of out of band signals does not affect system operation, even the filter step may be skipped.

Figure 4:
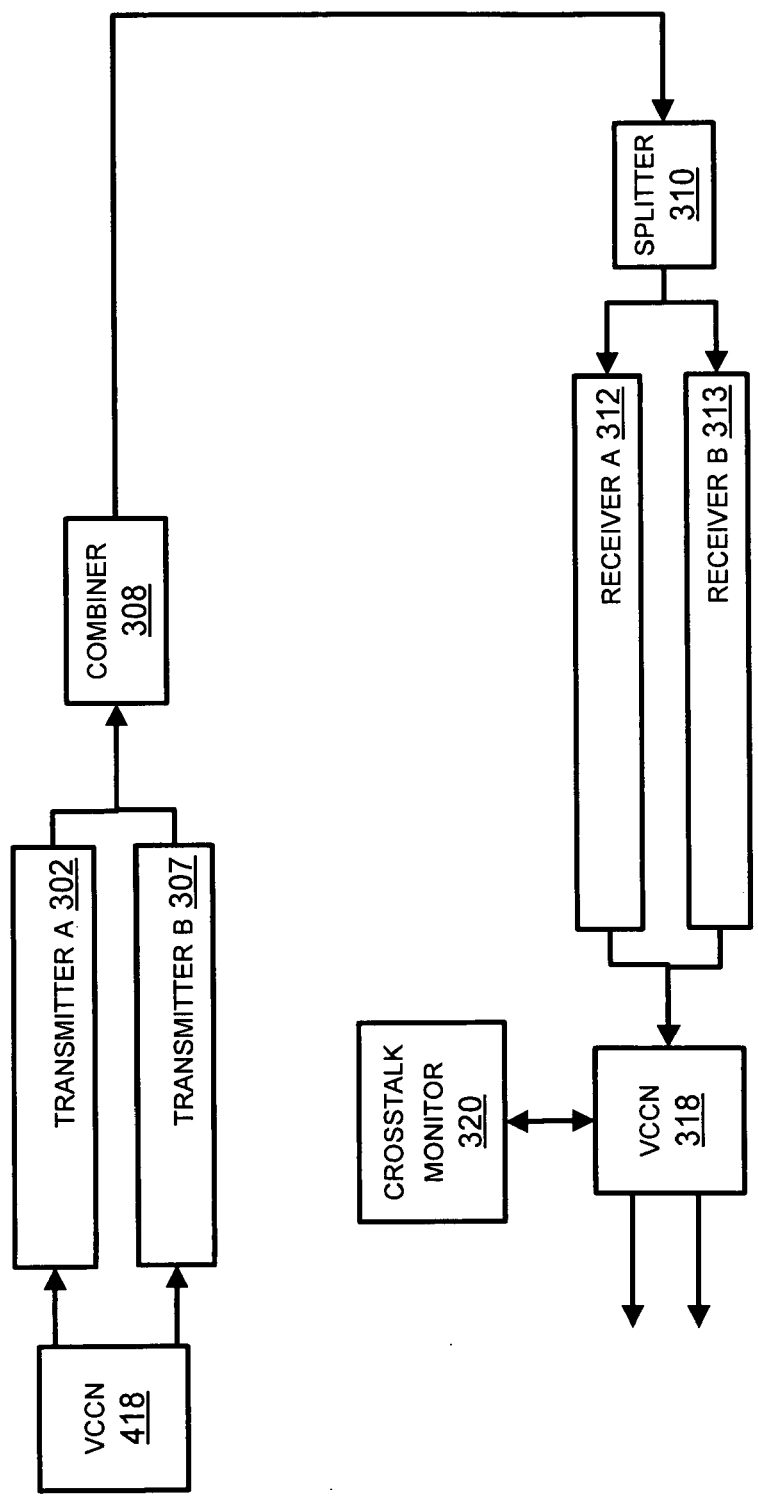
FIG. 4 shows an embodiment with a multi-wavelength communication system where the crosstalk between channels is measured at the output of the system.

FIG. 4 shows an embodiment with a multi-wavelength communication system where the crosstalk between channels is measured at the output of the system. A VCCN 318 at the output is driven such that the crosstalk is minimized. This or a different VCCN 418 may also reside at the transmitter end of the system and may receive feedback signals from the crosstalk monitor 320 at the receiver end, for example through the return path of the communication system. Alternately one may use a combiner network in the receiver that is controlled using feedback by monitoring the crosstalk in the output of that combiner network.

The previous discussion has been directed to the use of FQLs in transmitters. However, the same type of technology can be applied in receivers as well.

Figure 5:
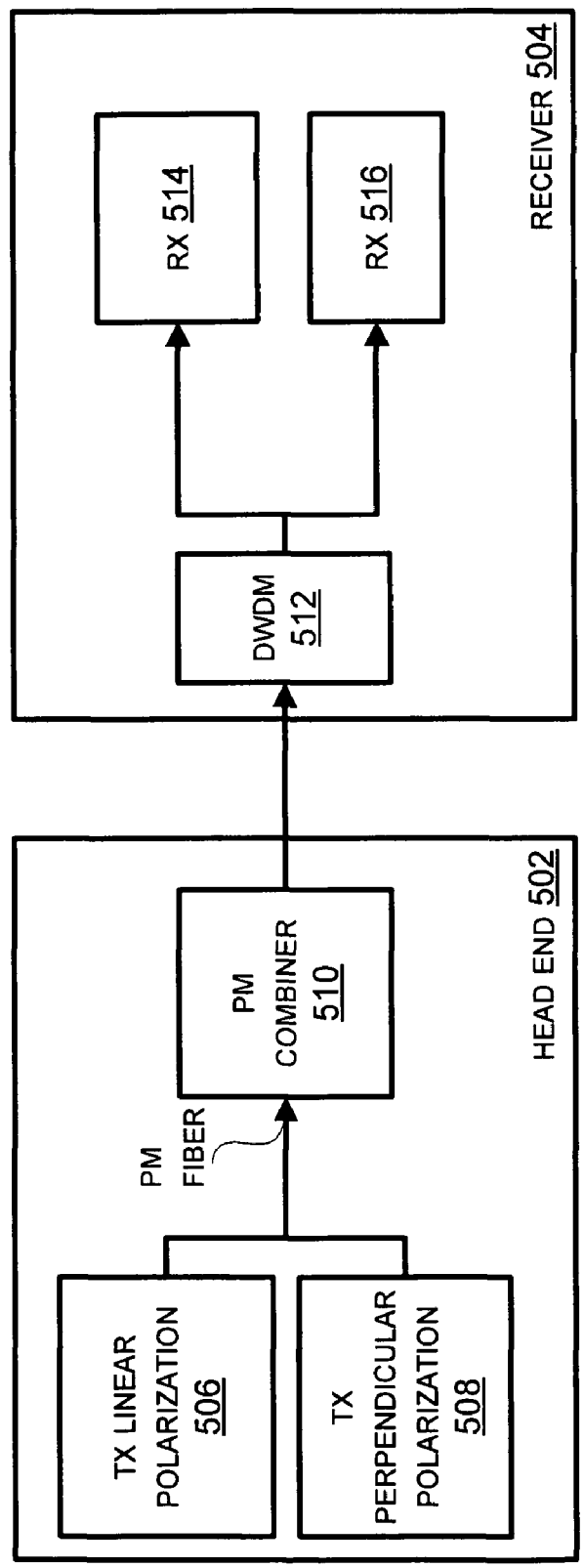
FIG. 5 is a block diagram of a head end comprising two transmitters each configured to transmit the same signal, where one signal is linearly polarized and other signal is perpendicularly polarized.

FIG. 5 is a block diagram of a head end 502 comprising two transmitters 506 508, each configured to transmit the same signal, where one signal is linearly polarized and other signal is perpendicularly polarized. The outputs of the transmitters 506 508 are sent to a polarization maintaining combiner 510 via polarization maintaining fibers. The combined signals are sent via a normal fiber, which introduces various distortions, including SRS. The signals are then received at a receive node 504 and split in a DWDM demux 512 and fed to respective receivers 514 516. Because SRS is polarization dependent, the SRS effect can be mitigated by maintaining orthogonal polarization signals.

Figure 6:
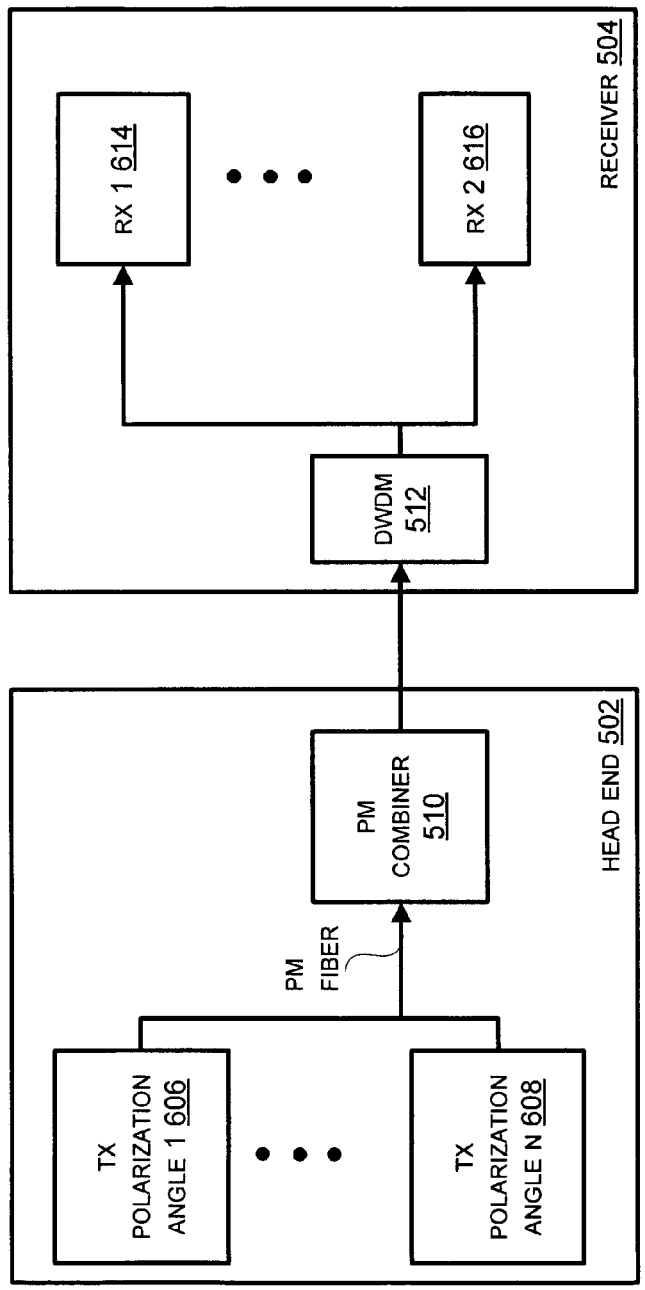
FIG. 6 is a block diagram of an implementation comprising a multiple wavelength transmitter where more than two transmitters are operated with different polarization values.

FIG. 6 is a block diagram of an implementation comprising a multiple wavelength transmitter where more than two transmitters 606 . . . 608 are operated with different polarization values. The differences in polarization values can be uniformly separated (e.g., by 90/n or 360/n). In another embodiment, the differences in polarization values are not uniformly separated. In one embodiment, the polarization values can be fixed or manually adjustable. In another embodiment, the exists a means to control the relative polarization state of the individual transmitters. In this embodiment, the receivers 614 . . . 616, via a return path not shown, report on SRS and other distortion effects, allowing for the respective transmitter to adjust the polarization to compensate for the SRS and other distortion observed by the receiver.

Figure 7:
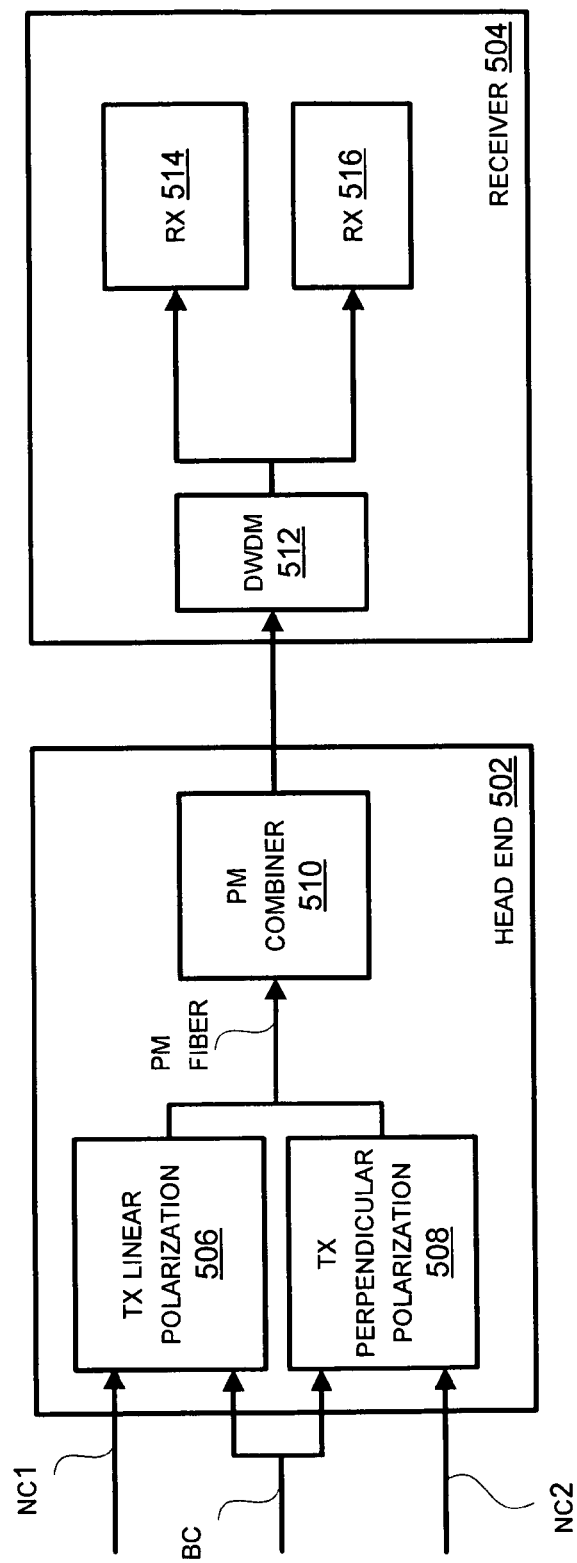
FIG. 7 shows another embodiment where the inputs to the two transmitters include unique narrowcast signals and a common broadcast signal.

FIG. 7 shows another embodiment where the inputs to the two transmitters include unique narrowcast signals (NC1 and NC2) and a common broadcast signal (BC). In yet another embodiment not shown, the inputs to the two transmitters include unique narrowcast signals and broadcast signals. In these embodiments, there is an additional input on the transmitters for low frequency signals that have shared information for the two (or more) output channels, whereas separate inputs are used for high frequency without shared information between the two channels.

SRS may be less prominent at high modulation frequencies. Thus, another embodiment of the present invention is a transmitter with means to change the modulation frequency spectrum present in the input signal spectrum. This would include an up converter in the transmitter to transpose at least part of the spectrum to a higher frequency.

In another embodiment, plural transmitters are fed by respective QAM filters to prevent and/or mitigate clipping. Techniques include those disclosed in Applicants' U.S. Pat. No. 6,583,906 as well as U.S. Pat. No. 6,549,316, the entire contents of each incorporated herein by reference. These techniques may be used in combination with the previously described FQL. Alternatively, it is possible to use the techniques disclosed in Applicants' U.S. Pat. No. 6,271,944 relative to laser wavelength control (the entire contents of which are incorporated herein by reference). These techniques may be used in combination with the previously described FQL.

SRS gain may drop when signal separation exceeds 110 nm. Thus another embodiment of the present invention includes a CWDM system with greater than 110 nm channel separation. Furthermore, transmitters with multiple wavelength outputs for example dual outputs that are separated by more than 80 nm are desirable (e.g., 1310 and 1550 nit).

SRS may be driven by the power envelope of the signal. Thus in one embodiment, a transmitter with a constant power output and phase modulator signal output is used. A receiver is used to detect the phase modulator output signal.

SRS may, in some implementations, primarily be a crosstalk phenomenon. Thus, in one embodiment, there is a transmitter with multiple inputs and outputs is used where signals from the inputs are filtered, level and phase are adjusted, and recombined before being sent to the optical outputs in such a way that the crosstalk between the channels on the fiber link is reduced.

Furthermore, another embodiment includes a corresponding receiver system with multiple inputs and outputs where signals from the inputs are filtered, adjusted in level and phase, and recombined before being sent to the optical outputs in such a way the crosstalk channels of the receiver fiber link is reduced.

Any one or combination of the above systems may be used with feedback control to control the combination of the input signals. Feedback control may be derived from the signals and/or from any added pilot reference signals or tones. Any one of the above described systems may optionally generate distortion signals which are added to the output such that the distortion signals are based on a combination of two or more available inputs.

The embodiments of FIGS. 5-7 or as otherwise discussed previously may be combined with each other and/or with the FQL of FIGS. 1-2 in a modular fashion that enables lower production costs, easier maintenance and repair, and that will launch better SRS/dispersion compensated light from the transmitter to the receivers.

All of the preceding techniques and devices may be adapted to DWDM embodiments. This involves transmission in lambda pairs to maintain total power and also to improve CNR, with the pairs modulated with (partly) the same information. Such embodiments require a DWDD and dual receivers. Also, semiconductor optical amplifiers (SOA) may be used. One advantage of an SOA over an EDFA is that an SQA has a gain flatness over a wide wavelength range. In one embodiment, a DWDM system with one 1550 nm pair and/or one 1310 nm pair (4 wavelengths/fiber) is used for full performance downstream. In this embodiment, signals are launched with orthogonal polarization states. In another embodiment, encoded information about the wavelength is sent to the receiver assist the receiver in identifying the linearization needed on the transmit end. In another embodiment, wavelength information is transmitted in the forward and reverse path. The transmitted wavelength information is used to construct a map of the analog access system so as to identify and report the unidirectional or bi-directional transport of wavelengths. This information is used to mitigate SRS and chromatic dispersion in concert with the previously described FQL. This technique is application to all transmitters, be they forward or reverse, coax or cooled, or part of pluggable transceiver or a discrete device.

While the discussion has focused on the SRS, there is also an additional cross phase modulation crosstalk effect that may be addressed. This cross phase modulation crosstalk phenomenon worsens in direct proportional to the input power, frequency, and dispersion and in inverse proportion to separation of wavelengths. In the case of analog transmission of around 20 km, SRS may be the dominating crosstalk. Cross phase modulation asserts itself however when the fiber distances are greater and when the wavelength separation is smaller thus attaining importance in DWDM transport for intermediate distances.

With a proliferation of multiple wavelength analog systems as described above, there will be a need for pluggable analog optical modules similar to conventional single wavelength digital modules. However, currently there are no analog grade pluggable transceiver modules in the market. Thus, another embodiment of the present invention includes the packaging of any one of the previously described devices into an analog grade module that is pluggable in a headend and/or in field optical nodes. Another embodiment of the present invention is a quasi-analog grade module that is pluggable in a headend and in field optical nodes. Another embodiment of the present invention is a multi wavelength pluggable module configured to enable bi-directional analog and quasi-analog transmission so as to enable forward operation on a single fiber. Another embodiment of the present invention is a multi wavelength bidirectional module in which the optical and electronic characteristics are separated such that the module can fit into a variety of optical transport platforms interchangeably. Other embodiments of the present invention include a pluggable transmitter, receiver and transceiver modules for single fiber or multi-fiber analog transport or quasi-analog transport.

In one embodiment, the optical laser and its driver are collocated on a single small board, optionally with the FQL, and the anti-clipping circuitry. This device is be the size of a GBIC (gigabit integrated circuit) or the SFP (small form pluggable) as defined by the respective GEIC and SFP commercial standards. The ability to compress in size the optoelectronic circuitry has the benefit of increasing density and deployment in already crowded headends and hubs and for promoting plug and play of optical components to enable faster deployments. The device may include a plug-in laser with the following defined characteristics: Wavelength, Power and PM output. A coax and butterfly package may also be included. The device may include an EPROM containing laser information such as Wavelength, Power Output, and transmitter serial number. The bias circuit may be located on a main board, supplying bias to a photodiode (PD) and to the laser. In the pluggable module is a FQL including: 550 MHz linearizer, 870 MHz, 1 GHz, CE Load, and a NTSC Load as built, regulated by the microprocessor with feedback from the control plane and held over temperature and over power levels. Feedback from the control plane connects the forward transmitter to the reverse transmitter. Any drift from the transmitters is detected by the respective receiver and is then passed on to the adjacent transmitter for transmission to the corresponding receiver adjacent to the transmitter. The package may include the ability to create these linkages and to close-loop monitor and adjust the system.

Some implementations may involve a graphical user interface (GUI) whereby an administrator may select which types of distortion cancellation to apply. For example, the GUI may have a tab whereby fiber dispersion cancellation may be turned on or off, and whereby the level of dispersion cancellation to apply may be selected. The GUI may have another tab whereby the user may select whether to add compensation for cross-modulation in multi-wavelength applications. The GUI may include selections for which wavelengths are present in the system.

Selections from the GUI may result in predetermined setpoints applied to the various diodes/varactors of the FQL 102.

In other implementations, the wavelengths used in the system may be automatically detected and pre-distortion settings applied automatically. For example, in 1310 nm single-wavelength applications there may be no need for significant dispersion compensation or cross-modulation compensation. Thus the only set points applied may be to correct for laser modulation non-linearity. If other wavelengths are detected in the system, distortion compensation for both fiber dispersion and cross-modulation may be applied on top of the corrections for laser non-linearity.

Only recently have un-cooled lasers been considered for use in full QAM fiber communications systems (e.g., Applicants' co-pending application U.S. patent application Ser. No. 09/896,547 filed on Jun. 29, 2001). More recently, techniques have been proposed for linearization over laser output power changes (see e.g., Applicants' co-pending application U.S. Provisional Application 60/650,973, filed on Feb. 9, 2005, the entire contents of which incorporated herein by reference).

The previously described FQL may be adapted for use with an un-cooled laser. In this embodiment, the four quadrant linearization receives a control signal relating to bias current changes. This control signal may be a manual and/or automatic signal that allows the FQL to match the changing distortion profile of the power variant laser. This embodiment of the FQL technique is used across the entire range or a sub-range of optical output power of an un-cooled laser to match the changing distortion performance of the laser generator. Also, the FQL technique is again adapted to receive control signals relative to temperature, power, and positive or negative fiber chromatic dispersion characteristics. In all embodiments, whether for cooled or un-cooled lasers, the previously described FQL techniques may be used in combination with other techniques aimed at reducing or eliminating fiber effects and non-linearities such as SRS, XPM or SPM individually or in combination.

Of the various distortions associated with multi-wavelength systems, stimulated Raman scattering (SRS) crosstalk is often the main limiter in the systems. SRS is a function of power output, wavelength, total power in the fiber, number of wavelengths, spacing of optical wavelengths, fiber distance/length, fiber dispersion, RF frequency and state of polarizations. These parameters interplay in very complex ways to cause dispersion. SRS has a 1/f dependence. That is, at low frequencies (e.g., 50 MHz) SRS is very high. However as frequency increases SRS decreases so that at 500 MHz to I GHz the SRS is low. The preceding comments assume two signals and SRS associated with the two signals.

SRS crosstalk may vary as a function of frequency separation between two signals. SRS crosstalk is very low at 10-20 nm separation. However SRS crosstalk increases reaching a maximum around 100 nm of separation. SRS crosstalk drops to a minimum occurring around 140 nm and stays relatively flat as separation increases from there.

SRS may also vary as a function of polarization and chromatic dispersion. As dispersion increases, SRS decreases. Thus, a good scenario may include two orthogonal signals carrying a signal greater than 500 MHz and with a spacing of less than 20 nm between the two signals or greater than 140 nm between the two signals, and over a fiber with high dispersion. Past 10 km, cross talk is a significant degradation in modem cable distribution systems. SRS is less prominent for orthogonal polarization states. That is, SRS varies with polarization. Thus one aspect of the present invention is directed to a dual transmitter with a combiner that combines into output wavelengths of the transmitter in an orthogonal polarization state. Each wavelength is capable of carrying its own modulation signal that may or may not in part carry the same information as the other signal. Launching different wavelengths of mutually orthogonal polarization may result in reduced SRS cross-modulation. One or more FQLs may also be driven to cancel composite second order distortion (and distortion in general) attributable to SRS cross-modulation. Formulas for determining SRS cross-modulation are well known in the art.

An application of an FQL as described herein to linearizing an un-cooled laser may involve:
1. Compute desired monitor current, this may be a fixed current or a value based on customer input representing a desired output power
2. Adjust laser bias to obtain desired monitor current
3. Adjust FQL set points according to present laser bias and laser temperature (optionally derived from module temperature)

Here the set points follow a predefined relation with laser bias and temperature that is designed in and with parameters that result from final testing. Final testing may include laser testing at more than one temperature Another application of an FQL as described herein to linearizing an un-cooled laser may involve:
1. Compute desired monitor current, this may be a fixed current or a value based on customer input representing a desired output power
2. Adjust laser bias to obtain desired monitor current
3. Adjust FQL set points in order to keep distortion monitor signals stable.

Here the set points are adjusted (with an iterative routine) to keep the distortion monitor signals stable to a predefined function. The function may include laser bias and temperature as variables and has additional parameters based on final testing, this testing may be performed at more than one temperature. Note that the pre-distortion vector required for different laser power and or temperature often comprises a component that swaps sign.

Another application of an FQL as described herein to linearizing an un-cooled laser based on controlling monitor current may involve:
1. Compute desired monitor current, this maybe a fixed current or a value based on customer input representing a desired output power
2. Set desired monitor current set point and allow laser bias control HW to stabilize to get this monitor current
3. Adjust FQL set points according to present laser bias and laser temperature (optionally derived from module temperature)

Here the set points follow a predefined relation with laser bias and temperature that is designed in and with parameters that result from final testing. Final testing may include laser testing at more than one temperature. Similarly this adjustment can be based on distortion monitor signals An application of an FQL as described herein in a transmitter to keep gain and tilt stable may involve:
1. Adjust gain, tilt and attenuator settings according to a predefined function of module temperature and customer input on desired gain and tilt
2. Optionally adjust the above in order to keep laser drive power constant
3. Optionally adjust the above to set laser drive power at a value depending on laser temperature and/or module temperature and/or customer input An application of an FQL as described herein to compensate for fiber distortion may involve:

1. Monitor laser temperature and compute laser wavelength L
2. Compute fiber dispersion at laser wavelength as: Db=DS*(L−Lo) where DS is the dispersion slope and Lo is the fiber dispersion zero
3. Compute required linearization level as product of fiber length and DL (note this can be positive and negative depending on sign DL)
4. Set FQL set points accordingly to cancel fiber distortion.

Note that the set points may contain offsets, for instance given by additional laser distortion that needs cancellation and may also contain functions where the FQL control signals are interrelated due to circuit implementation limitation. These functions are predefined and parameters are preset or determined in final test. Note that going from positive to negative dispersion compensation requires switching distortion vector phase from approximately +90 to −90 degrees.

An application of an FQL as described herein to compensate for fiber and link distortion may involve:
1. Monitor receiver feedback signals that provide a measure of distortion in the system
2. Adjust FQL set points distortion measured at the receiver following a predefined optimization scheme.

An application of an FQL as described herein to clipping noise reduction may involve:
1. Monitor receiver type used
2. If receiver type is de-companding type then enable companding of signals at the transmitter by:
Setting high CTB (compression type) and/or
Setting high CSO (superlinear type)

An application of an FQL as described herein to receiver linearization may involve:
1. Monitor receiver type used
2. If receiver type can self-linearize then set pilot tones accordingly Note that in the distortion monitor or level-monitoring schemes mentioned above pilot tones can be used. Distortion in an un-cooled laser is temperature dependent and the dependence is such that the vectors shift to the left as the device gets hot; the device becomes sub-linear at hot. At cold the device is slightly super-linear. This is seen as a sign swap in the real axis when the laser temperature is varied.

In view of this situation, the FQL may be configured to generate compensating vectors such that the sum of laser and linearizer vectors is near the origin. The FQL may be configured to swap the sign of the real axis component generated by the linearizer as the laser changes temperature. In this example the variation in the imaginary part of the distortion vector is not large. The process described below provides an example implementation of a linearizer control that allows moving the distortion vector through different quadrants.

| | |
|---|---|
| //Input variables | |
| Laser_temp | //Laser temperature |
| //Output variables | |
| CV_pos_Re | //Control voltage to set positive real distortion |
| CVneg_Re | //Control voltage to set negative real distortion |
| CV_pos_Im | //Control voltage to set positive imaginary //distortion |
| CV_neg_Ini | //Control voltage to set negative imaginary distortion |
| //Functions | |
| CV_re(x) | //Control voltage real axis as a function of //required distortion vector length x |
| CV_im(x) | //Control voltage imaginary axis as a function of //required distortion vector length x |
| //Parameters | |
| Predist_Re_ref | //Real part predistorter required at reference temperature |

-continued

```
Predist_Ini_ref      //Imaginary part predistorter required at reference
                     //temperature
Temp_ref             //Reference temperature
Temp_slope_Re //Slope of real part of distortion vector per unit
                     //temperature
Temp_slope_Im //Slope of imaginary part distortion vector per
                     //unit temperature
//Process
Re_predist= Predist_Re_ref+
Temp_slope_Re*(Laser_temp-Temp_ref)
Im_predist=Predist_Im_ref +
Temp_slope_Im*(Laser_temp-Temp_ref)
If Re_predist > 0 then
CV_pos_Re=CV_re(Re_predist)
CV_neg_Re= CV_re(0)
else
CV_neg_Re=CV_re(-Re_predist)
CV_pos_Re=CV_re(0)
end if
If Im_predist >0 then
CV_pos_Im=CV_im(Im_predist)
CV_neg_Im= CV_im(0)
else
CV_neg_Im= CV_im(-Im_predist)
CV_pos_Im=CV_im(0)
end if
//End process
```

In this case the parameter Temp_slope_Im is a very low value such that the imaginary distortion vector is not very temperature dependent. The parameter Temp_slope_Re is large such that over the temperature range the sign of Re_predist will swap and the algorithm will thus accordingly activate another branch of the linearizer to cover a new quadrant.

Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A circuit comprising:
a signal distortion generator circuit configured to generate distortion vectors in any of four distortion vector quadrants, the distortion generator comprising:
   an RF splitter adapted to split an RF input signal into positive and negative outputs;
   a first diode current shunt between the positive output of the RF splitter and ground;
   a second diode current shunt between the negative output of the RF splitter and ground;
   a first varactor current Shunt between the positive output of the RF splitter and ground; and
   a second varactor current shunt between the negative output of the RF splitter and ground;
wherein the first diode current shunt is configured to produce a positive real component of an RF predistortion signal, the second diode current shunt is configured to produce a negative real component of an RF predistortion signal, the first varactor current shunt is configured to produce a positive imaginary component of an RF predistortion signal, and the second varactor current shunt is configured to produce a negative imaginary component of an RF predistortion signal.

2. The circuit of claim 1, further comprising:
a positive signal amplifier coupled to the positive output of the RF splitter, and
a negative signal amplifier coupled to the negative output of the RF splitter.

3. The circuit of claim 2, further comprising:
a first feedback circuit connecting the positive output of the RF splitter to an input of the negative signal amplifier, and a second feedback circuit connecting the negative output of the RF splitter to an input of the positive signal amplifier.

4. The circuit of claim 3, further comprising:
a controlled signal source coupled to inject current into the first and second feedback circuits.

* * * * *